Nov. 12, 1929.  C. J. VICTOREEN  1,735,363
MASTER CONTROL
Filed June 3, 1926   3 Sheets-Sheet 1
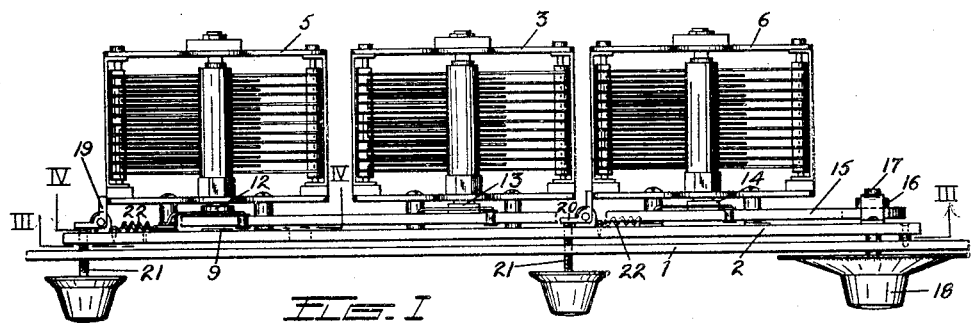
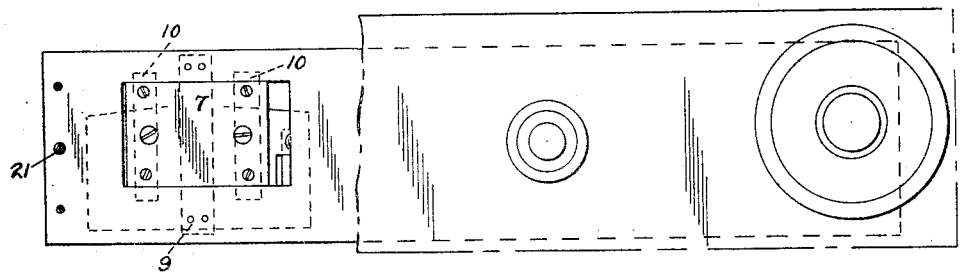
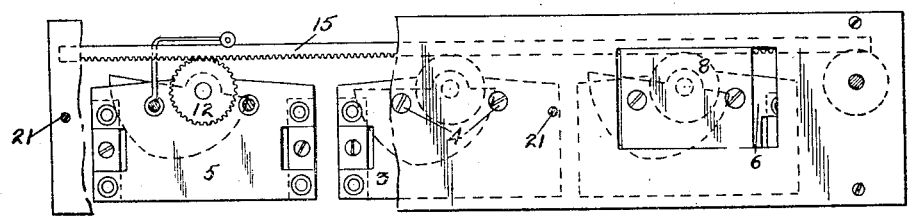
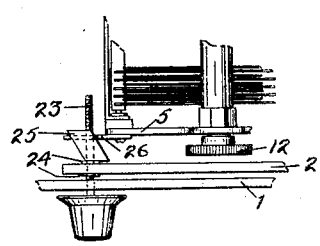
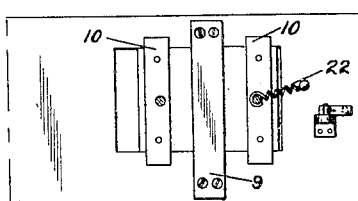

Nov. 12, 1929.   C. J. VICTOREEN   1,735,363
MASTER CONTROL
Filed June 3, 1926   3 Sheets-Sheet 2
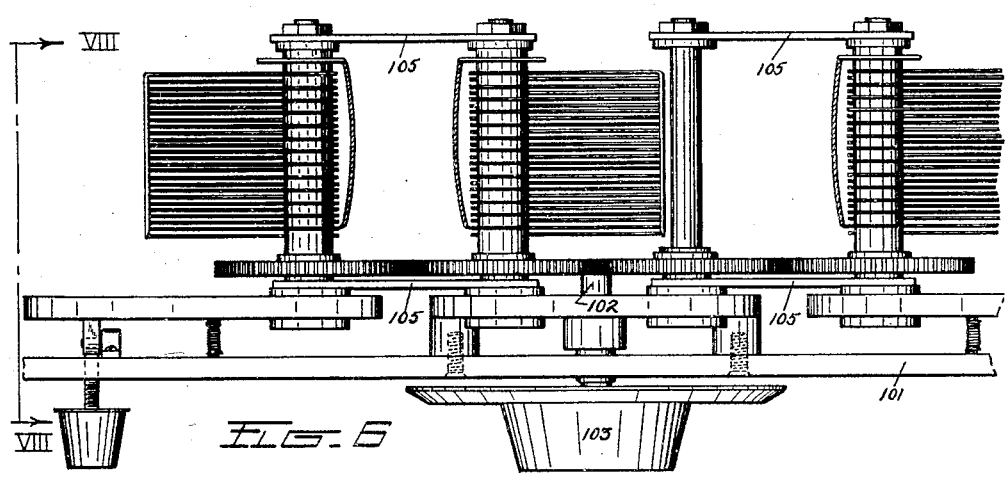
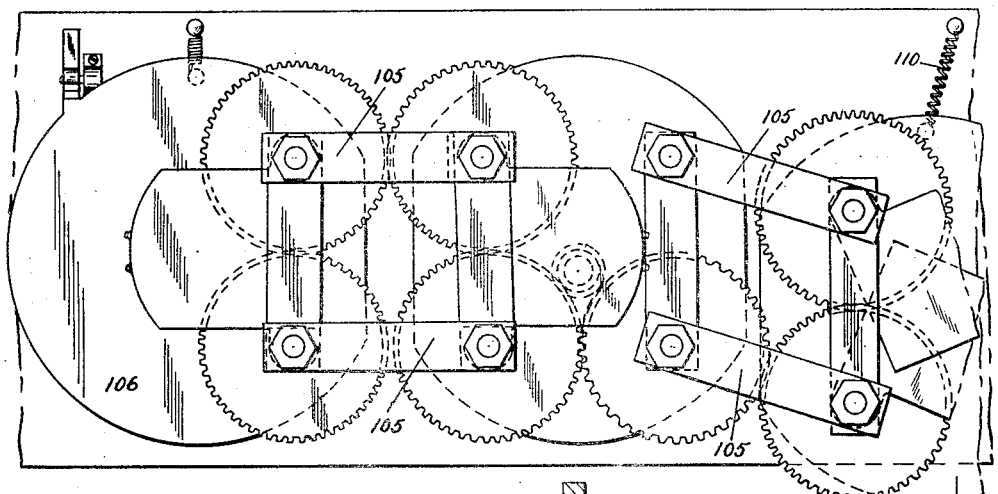
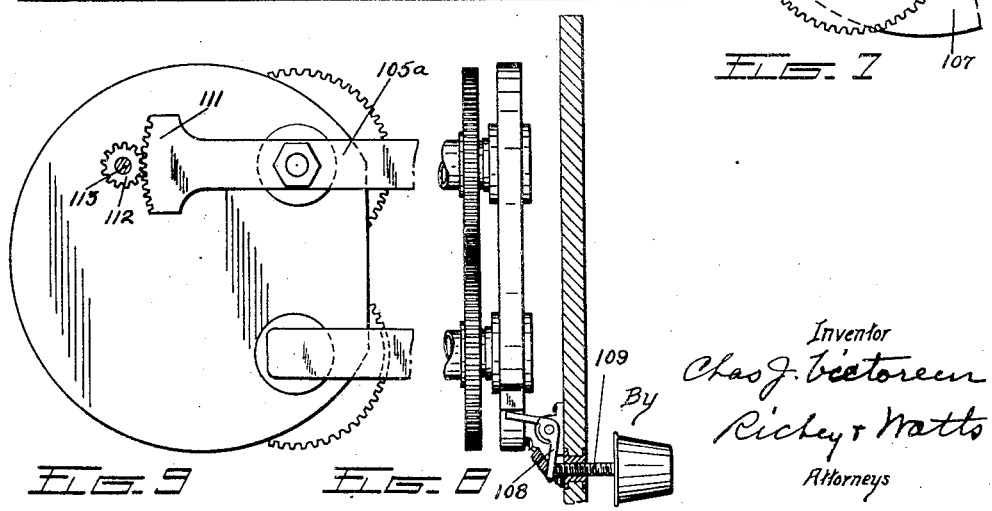

Nov. 12, 1929.     C. J. VICTOREEN     1,735,363
MASTER CONTROL
Filed June 3, 1926     3 Sheets-Sheet 3
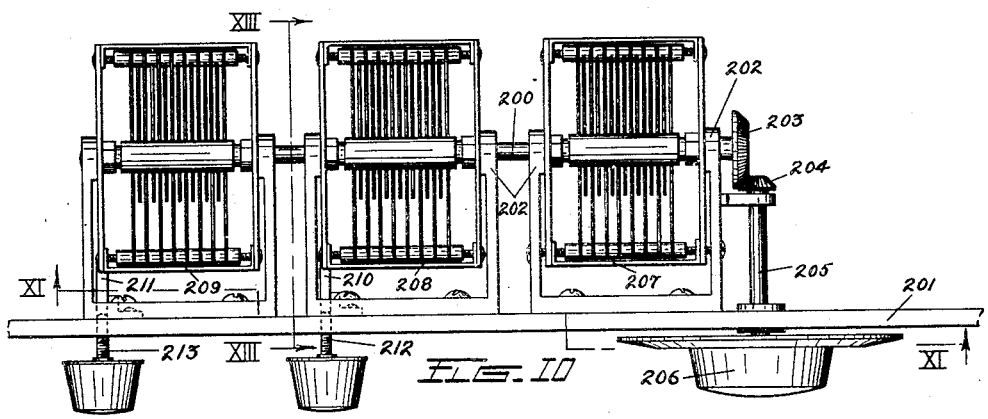
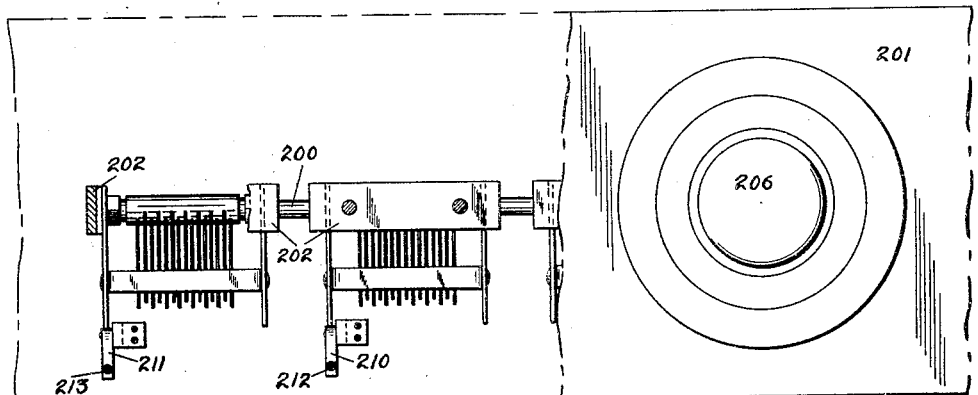
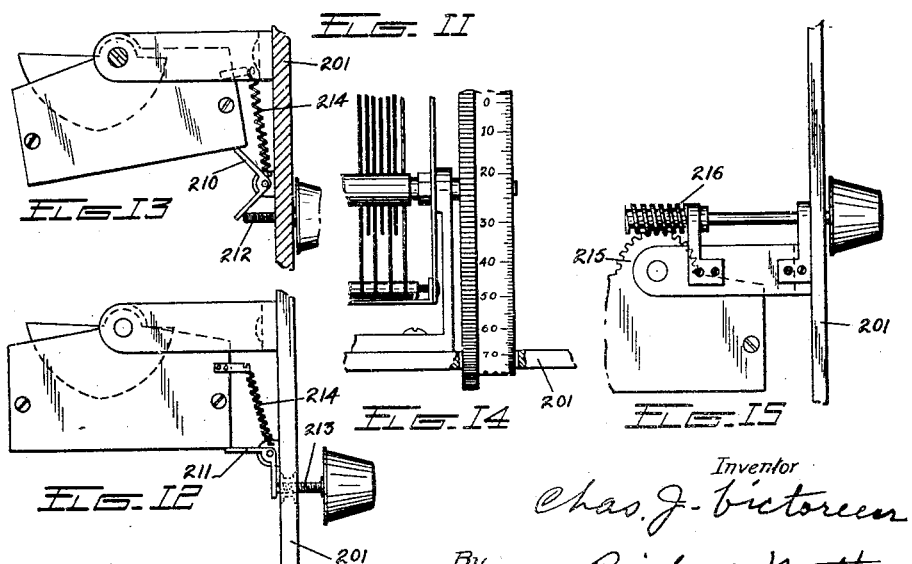
Inventor
Chas. J. Victoreen
By Richey & Watts
Attorneys Patented Nov. 12, 1929

1,735,363

UNITED STATES PATENT OFFICE

CHARLES J. VICTOREEN, OF CLEVELAND HEIGHTS, OHIO

MASTER CONTROL

Application filed June 3, 1926. Serial No. 113,413.

This invention relates to a master control. The control to which it relates is particularly suited for the adjustment of apparatus such as the tuning devices used in radio.

An object of this invention is to provide a control by which a plurality of movable elements may be moved simultaneously and in which the relation of each individual element to an associated part may be varied independently of the others.

Other objects will hereinafter appear.

The invention will be better understood from the description of several practical embodiments thereof illustrated in the accompanying drawings, in which, Fig. 1 is a plan view of a series of variable condensers mounted on a radio panel and provided with a control embodying the invention.

Fig. 2 is a front elevation with part of the panel broken away.

Fig. 3 is a section on line III—III of Fig. 1 with part of the sub-panel broken away.

Fig. 4 is a view of line IV—IV of Fig 1.

Fig. 5 is a fragmentary plan of a modified adjuster for one of the condensers.

Fig. 6 is a plan view of a series of variable condensers of a different type provided with another embodiment of the invention.

Fig. 7 is an inverted rear elevation thereof.

Fig. 8 is a section on line VIII—VIII of Fig. 6.

Fig. 9 is a fragmentary front elevation, with the panel removed, of a modified adjuster for one condenser.

Fig. 10 is a plan view of an embodiment of the invention applied to a differently arranged series of condensers.

Fig. 11 is a front elevation of Fig. 10, parts being broken away on line XI—XI.

Fig. 12 is an end elevation of Fig. 10.

Fig. 13 is a section on line XIII—XIII of Fig. 10.

Fig. 14 is a fragmentary section of the parts of Figs. 10 and 11 with a different type of dial, and Fig. 15 is an end elevation showing a modified adjuster for the condensers of Figs. 10 and 11.

In Figs. 1, 2 and 3, a series of three variable condensers of conventional design are illustrated mounted behind a radio panel 1 with their shafts which carry the movable or rotor plates of the condensers normal to the plane of the panel. For convenience in assembly and to prevent piercing the panel for unnecessary bolts, the condensers are carried upon a second or sub-panel 2 secured to the back of that visible from the front of the apparatus.

One condenser 3 is mounted on the second panel in much the usual manner, screws 4 passing through the panel into pillars carried by the frame of the condenser. The other condensers 5 and 6 are mounted upon rectangular pieces of insulating material 7 and 8 arranged to slide lengthwise of the panel in rectangular slots cut therein. These pieces are free to slide in the slot, but restrained from coming out of the same as by metal strips 9 secured to the panel and other strips 10 secured to the pieces 7 and 8 and overlapping the panel above and below the opening.

The shafts which carry the movable or rotor plates of the condensers do not project through the panel, but are cut off, leaving only enough projecting from the frames of the condensers to the carry pinions 12, 13 and 14. These pinions all mesh with a movable rack 15, extending longitudinally along the back of the panel and operated by a pinion 16 carried on a shaft 17 which projects through both panels 1 and 2, and is provided at its outer end with a dial or knob 18 which may be rotated.

Adjacent the movable condenser frames bell cranks 19 and 20 are pivoted on the back of the sub panel. The rearwardly extending arm of each crank bears upon the condenser frame and the laterally extending arm may be moved backwardly by a screw 21 passing through a threaded bushing carried by the second panel and a hole in the first panel and provided at its outer end with a knob. By turning this knob the condenser may be slid along the slot of the second panel against the tension of a spring 22 which tends to return it to its original position when pressure on the bell crank is released.

As the condenser moves along the slot, the pinion of this condenser travels along the rack and rotates the movable plates of the condenser relative to the fixed plates thereof, as shown in Fig. 3.

By this means, the relation of the stator and rotor plates of either of the two movable condensers may be varied without movement of the control dial.

When it is desired to adjust the fixed condenser relative to the other or movable condensers, it is only necessary to turn the rotor plates of the stationary condenser and then adjust the movable condensers, so that their stator and rotor plates occupy the same relative position which they originally had.

In Figure 5, a modification of the adjusting means above described is illustrated. It consists of a screw 23 passing through the panels and prevented from longitudinal movement therein by collars 24. The screw carries on its inner end a block 25 having two inclined surfaces which engage the sides of a notch in an extension 26 of the movable condenser frame. By rotating the screw to slide the block therealong, the condenser may be cammed to one side or the other and the adjustment thereof varied.

In Figs. 6, 7 and 8, an embodiment of my invention is illustrated which is particularly adaptable to condensers each provided with two sets of movable plates, the shafts of which are geared together, so that the plates move simultaneously in opposite directions. As illustrated in these figures, one condenser of this type is mounted in a stationary position upon the panel 101. The operating shaft 102 of this condenser extends through the panel and is provided on its outer end with a handle or dial 103 and at its inner end with a pinion 104. Links 105 are carried by the stationary condenser and these in turn carry movable condensers, each with one gear in mesh with one gear of the stationary condenser. The movable condensers may be adjusted relative to the stationary one by being moved up or down.

In the drawings, two movable condensers 106 and 107 are shown, one at each side of the stationary condenser. The one to the right, 107, is shown as moved down so as to cause the plates to separate more than the plates of the others. Any suitable means may be provided for adjusting the movable condenser and in Figures 6, 7, and 8, this is illustrated as a bell crank 108 operated by a screw 109 in much the same manner as shown for adjusting the condenser of the first modification. Springs 110 may be provided to hold the condensers down upon the bell cranks.

In Fig. 9, another form of adjustment for the movable condenser is illustrated which consists of extending one of the links 105ª beyond its movable condenser and forming the end thereof into an arcuate rack 111, following the curvature of a circle having its center at the fixed pivot of the link. Engaging this rack is a pinion 112 mounted on a shaft 113 projecting through the panel and carrying at its outer end a knob or other means by which it may be adjusted.

Another arrangement of condensers is illustrated in Figs. 10 to 15, in which the movable plates of a series of condensers are mounted upon a common shaft 200 extending horizontally and parallel to the panel 201 of the apparatus. This shaft is carried in suitable bearings 202 between the different sets of movable plates and is provided at one end as shown in Figs. 10 and 11 with a beveled gear 203 which meshes with another gear 204 carried by a shaft 205 extending through the panel and provided at its outer end with an operating dial 206. Preferably gear 204 is half the diameter of the gear 203 as shown, so that while the plates are moved from position of maximum capacity to position of minimum capacity in revolving 180', an entire revolution of the dial is utilized, thus permitting accurate and fine adjustment of the condenser. The stator 207 of one of the condensers may be fixed to the panel or bearing frame. The stators 208 and 209 of the other condensers are preferably mounted upon the shaft so that they can pivot thereon and be moved thereabout to a limited extent. The means for adjusting these may consist of bell cranks 210 and 211 carried by the panel and screws 212 and 213 through the panel and provided with knobs upon their exterior ends, and springs 214 for returning the stators to normal position upon release of the pressure upon the screws.

As illustrated in Figure 15, the end plate of the stator frame 215 may be formed with a sector shaped projection with teeth which may be engaged by a worm wheel or a threaded shaft 216 by which the stator may be positively rocked in either direction to provide the required adjustment.

The beveled gears 203 and 204 and shaft 205 may be replaced by a dial mounted directly upon the end of the shaft as shown in Fig. 14. This dial may be either rigid with the shaft or geared thereto to permit a greater motion of the dial than the shaft, and thus facilitate finer adjustment of the condenser.

While I have illustrated my invention as applied to variable condensers, it will be obvious that it is applicable to any variable apparatus as for instance the condensers might be replaced with variometers or the like, without any change in the control, or the control may be used for apparatus other than radio. I have illustrated my invention throughout as applied to a series of three condensers, this being a common number in radio receiving sets of the tuned radio frequency type, but it will be obvious that any number of condensers might be similarly controlled.

It will also be obvious that many arrangements of shafting, gearing or other forms of connection might be interposed between the condensers.

I, therefore, do not limit myself to the precise embodiments shown, but claim as my invention all embodiments, variations and modifications thereof, coming within the scope of the subjoined claims.

I claim:

1. A control for a plurality of devices, each having two relatively rotatably adjustable parts, comprising means for rotating one part of each device simultaneously, and means for translating the other part of one of the devices independently of the others, to cause rotation of the first mentioned part relative thereto.

2. A control for a plurality of devices each having a relatively adjustable rotor and stator, the rotors being mounted on parallel shafts, which comprises a pinion on each shaft, a rack engaging said pinions for moving them simultaneously and equally, an actuating handle having a pinion engaging said rack, and means for moving the stator of one device relative its rotor and independently of the others.

3. A control for a plurality of devices each having a relatively adjustable rotor and stator, the rotors being mounted on parallel shafts, which comprises a pinion on each shaft, a rack engaging said pinions, an actuating handle having a pinion engaging said rack, and means for translating the stator of one device independently of the others to cause its pinion to travel along the rack and rotate its rotor independently of the other rotors.

4. A control for a plurality of devices each having a relatively adjustable rotor and stator, the rotors being mounted on parallel shafts, which comprises a common drive for all said shafts, an actuating handle for said drive, and means for translating the stator of one device independently of the others to cause its shaft to travel along the drive mechanism and rotate its rotor independently of the rotors of the other devices.

5. A control for a plurality of devices each having a relatively adjustable stator and rotor, which comprises means for simultaneously rotating the rotors of all the devices, means for preventing rotation of the stators of all the devices, and means for permitting translation of the stator of one device to cause rotation of its rotor relative thereto.

6. A control for a plurality of devices each having a relatively adjustable stator and rotor, which comprises means for simultaneously rotating the rotors of all the devices, means for maintaining the stator of one device in a stationary position, rectilinear guides supporting the stator of another device and preventing rotation thereof relative the said first mentioned device, and means for translating said second mentioned stator along said guides.

7. A control for a plurality of devices each having two relatively adjustable parts, one moved relative the other by a shaft, which comprises a common drive for all said shafts, a common support for all said second mentioned parts, means on the support for preventing rotation of said second mentioned parts, guide means supporting one of said second mentioned parts for translation on said support and means for translating said part along said support.

CHAS. J. VICTOREEN.